United States Patent [19]

Plante

[11] 4,249,277
[45] Feb. 10, 1981

[54] LOBSTER BUOY SPINDLE

[76] Inventor: Emile Plante, 74 Badgers Island, Kittery, Me. 03904

[21] Appl. No.: 942,620

[22] Filed: Sep. 15, 1978

[51] Int. Cl.³ .............................................. B63B 21/52
[52] U.S. Cl. ....................................... 9/8 R; 114/230; 43/100
[58] Field of Search ...................... 9/8 R, 8.3 R, 8.3 E, 9/9; 43/100, 103

[56] References Cited

U.S. PATENT DOCUMENTS

| 3,077,614 | 2/1963 | Lloyd | 9/8 R |
| 3,360,811 | 1/1968 | Bartlebaugh | 9/8 R |
| 3,694,837 | 10/1972 | Von Norring | 9/8 R X |
| 3,724,120 | 4/1973 | Richard | 43/100 |
| 3,942,203 | 3/1976 | Perkins | 9/8 R |
| 4,019,214 | 4/1977 | Shaw | 9/8 R X |

Primary Examiner—Trygve M. Blix
Assistant Examiner—D. W. Keen
Attorney, Agent, or Firm—William Nitkin

[57] ABSTRACT

An improved lobster buoy spindle member comprising a buoy spindle having apparatus for the retention of a float member thereon and having at the base thereof a pivot member to allow the rotation of a rope line extending from a trap when affixed thereto.

5 Claims, 3 Drawing Figures

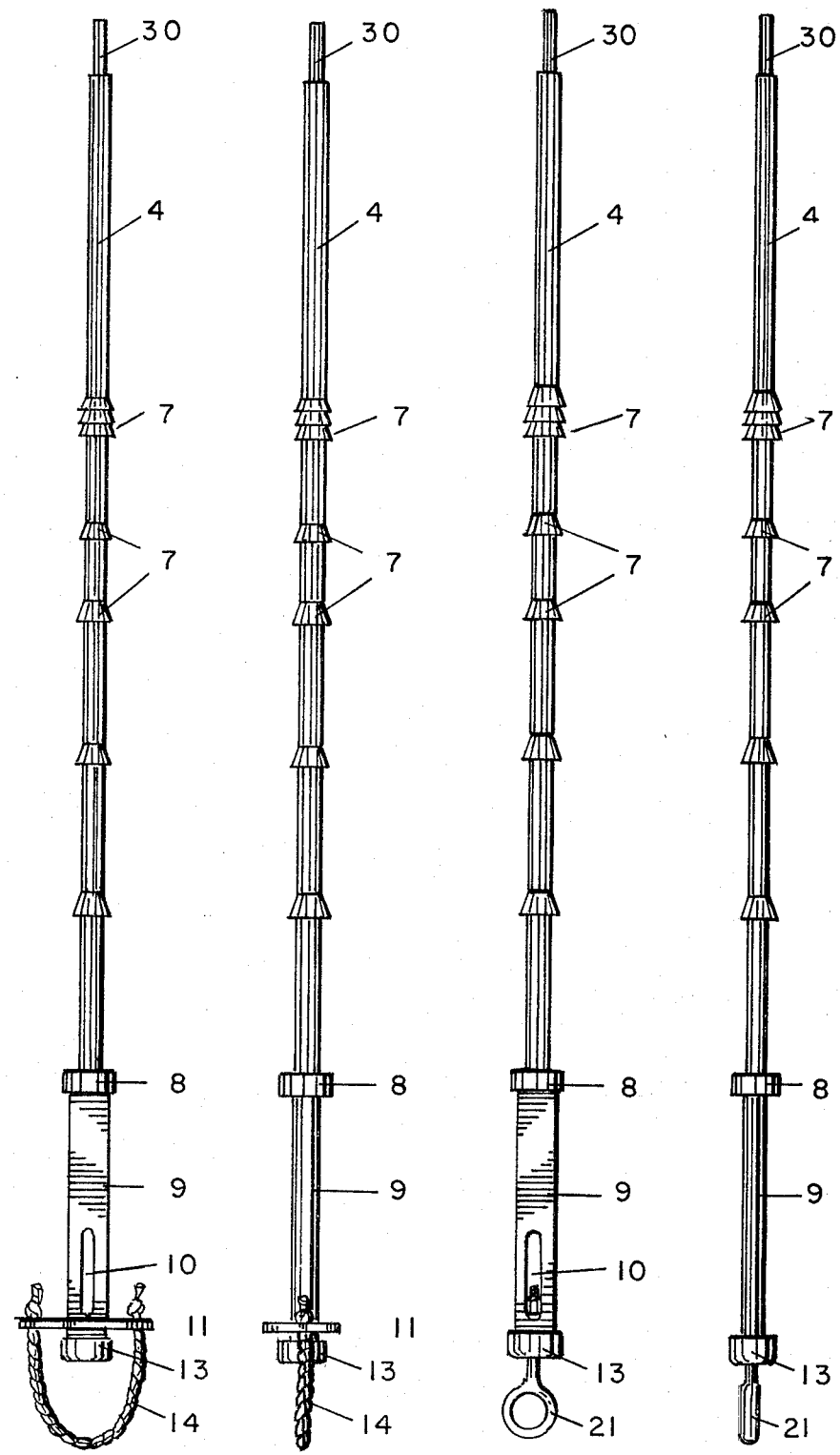

LOBSTER BUOY SPINDLE

BACKGROUND OF THE INVENTION

1. Field of the Invention

The device of this invention resides in the field of lobster traps and more particularly relates to an improved lobster buoy spindle member.

2. History of the Prior Art

The traditional method of capturing lobsters in the ocean consists of dropping a trap to the bottom of the ocean attached by lines to a buoy which usually has indicia on it indicating its owner. The lobsterman later picks the buoy up from the water and raises the trap by pulling on the rope by means of a wench. Lobster buoys commonly have float members with a spindle running therethrough. The float members now in use are usually composed of a styrofoam-type material. The spindle is constructed of wood and has at its base attached from one side of the spindle to the other a strap of heavy rubber-like material forming a fixed loop. This rubber-like material often is composed of strips from discarded tires. The rope line which attaches to this loop extends down to the trap can often twist and become unlaid due to the movement of the ocean water. This twisting and unlaying of the rope tends to weaken the fiber, whether it be natural or synthetic, in combination with the wenching of the rope around the drumhead, will cause premature fraying and failure of the rope. Since the current practice is to construct the buoy spindles out of wood, these buoy spindles after a period of use in most waters will rot due to the action of salt water and marine organisms.

SUMMARY

It is an object of the device of this invention to provide a device which prevents damage of the rope line extending from the buoy's spindle to the trap due to twisting or unlaying of the rope by providing a pivot member at the base of the buoy's spindle which rotates as the rope line twists from various actions of the ocean. In current practice there is usually employed an immersible float intermediately disposed along the line between the trap and the buoy's spindle member. This immersible float allows the rope to float upward away from the bottom of the ocean so that it will be less likely to become tangled among the bottom rocks and vegetation of the ocean floor.

The device of this invention is comprised of an improved buoy spindle member which has thereon a plurality of stepped retaining projections along the central portion thereof adapted to engage a float member when the float member is inserted onto the buoy spindle through the float member's central aperture. The float members are commonly composed of styrofoam or similar buoyant compressible, resilient material so that when it is placed on and forced over the stepped retaining projections, these projections extend into the mass of the float and assist in holding the float member in place. On the stepped retaining projection immediately above the float a retaining washer of a plastic semi-resilient material is engaged after passing down the spindle by forcing the washer over the exposed stepped retaining projection so that the float member is held securely onto the buoy's spindle. The float member's base is usually held by a portion of the spindle designated as a float stop which projects sufficiently from the spindle so that it is wider than the float member aperture and prevents further downward movement of the float member. At the base of the buoy spindle is the pivot member. Two pivot member embodiments are discussed herein but other equivalent pivot members could be utilized within the scope and practice of the present invention. One such pivot member can be comprised of a pivot plate having a pivot plate spindle aperture centrally located therein which passes over the spindle base in a fashion so as to be axially rotatable thereon. A base cap is formed on the bottom of the spindle base and retains the pivot plate member in position on the buoy spindle in a manner so that it can rotate but will not come off. A tie line is extended from one side of the pivot plate member to the other and can be affixed thereto utilizing pivot plate line tie apertures by merely passing the line through each such aperture and tying a knot at each end thereof which will prevent the line from passing back out through such apertures thereby forming a loop at the base of the pivot plate onto which the rope line extending to the trap can be attached. This pivot plate and resulting loop of the line tie will rotate as needed while the buoy spindle is utilized and will prevent twisting and unlaying of the rope line from occurring.

It should be noted that the spindle base which is shown having narrow flattened sides should have round edges so as to allow for easy rotation of the pivot plate due to the fact that if it had square edges and the pivot plate rotated at an angle slightly off 90 degrees, it might catch against the spindle base.

A second embodiment of the device of this invention incorporates a nut aperture within the spindle base adapted to hold a nut member affixable to the shank of a ring member which shank is passed through a base cap aperture extending through the base cap longitudinally through the spindle joining into the nut aperture so that when the nut is placed into the aperture, the shank of the ring member can be inserted through the base cap aperture and affixed to the nut in a fashion so as to allow rotation of the ring member. The ring member is then attached to the rope line extending down to the immersed float and/or trap as the device is utilized and will rotate in the same manner as the pivot plate described above.

BRIEF DESCRIPTION OF THE DRAWINGS

FIG. 2 illustrates the front and side views of the spindle of the device of this invention utilizing a pivot plate.

FIG. 3 illustrates a front and side view of the device of this invention utilizing a ring member.

DESCRIPTION OF THE PREFERRED EMBODIMENT

Figure 1:
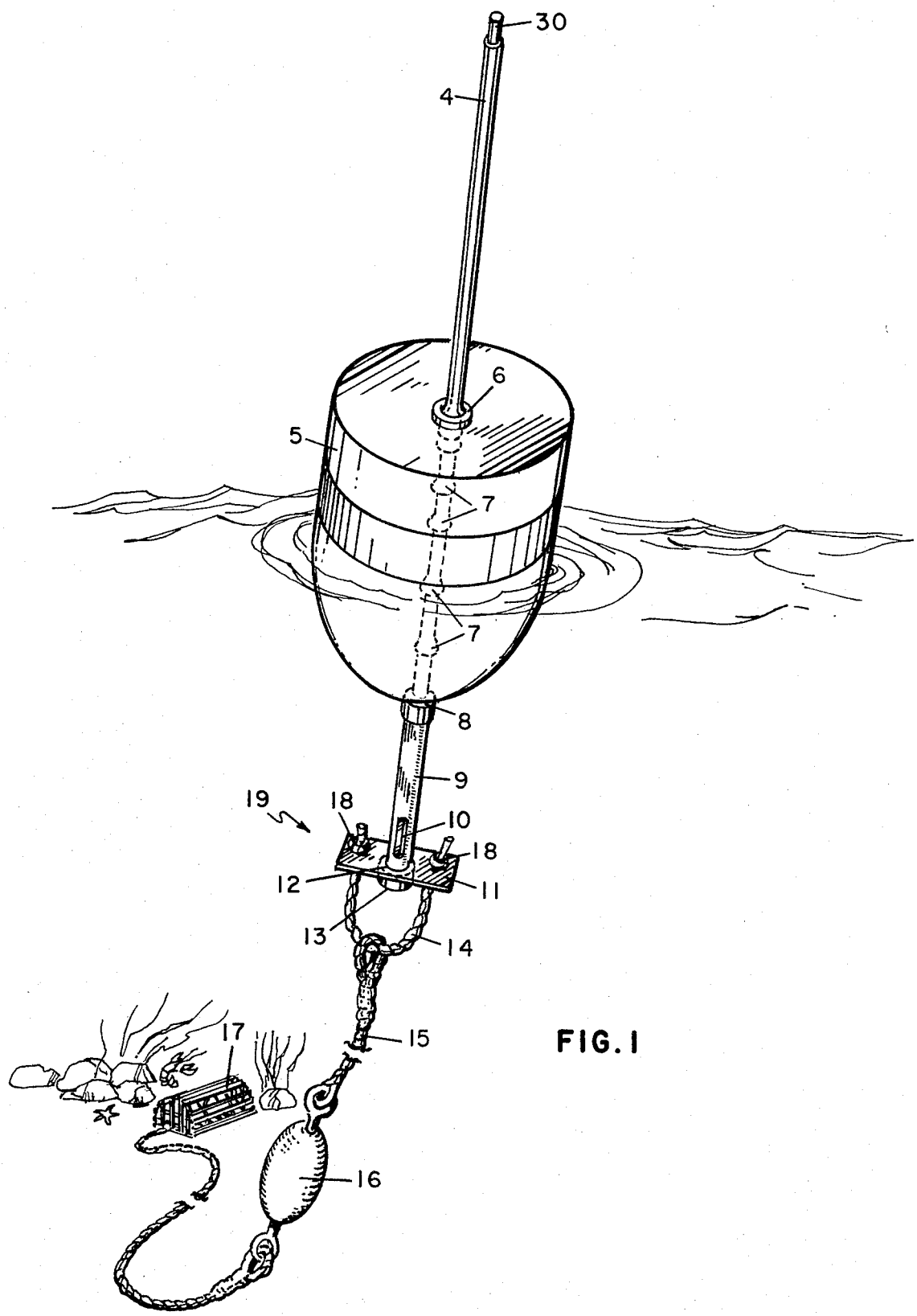
FIG. 1 illustrates a perspective view of the pivot plate embodiment of the device of this invention attached to a trap.

FIG. 1 illustrates a perspective view of the device of this invention utilizing the pivot plate type rotation member at the base of the buoy spindle. Seen in this view is buoy spindle 4 and float member 5 inserted thereon extending down and stopped by float stop 8. Seen in outline form is a plurality of stepped retaining projections 7, the projection positioned beyond the top of float 5 being utilized to hold retaining washer 6 to hold float 5 onto buoy spindle 4. At spindle base 9 is pivot member 19 which allows for the rotation of rope line 15 extending from trap 17 to buoy spindle 4. Intermediately disposed along the rope line is seen immersed float 16 which is commonly utilized with such lobster trapping apparatus. Pivot place 11 has centrally defined therein a pivot plate spindle aperture 12 into which is received spindle base 9. Pivot plate 11 is held onto spindle base 9 by base cap 13 in a manner so that it is axially rotatable thereon. Pivot member line tie 14 is affixed to pivot plate 11 from one side thereof to the other. One method of attachment of such line tie 14 is to have a pair of pivot plate line tie apertures 18 on either side of pivot plate 11 through which the line tie 14 extends, each end being tied in a knot thereby retaining line tie 14 to pivot plate 11 and allowing rotation of the resulting formed loop of line. Other equivalent means of attachment of the line to pivot plate 11 can be utilized.

A second embodiment seen in FIG. 3 utilizes as a pivot member, ring member 21 which is attached by shank 23 through base cap aperture 22 and is held in position by nut 26 which is attached to shank 23 in such a manner as to allow for rotation of ring member 22 thereby preventing tangling or unlaying of rope line 15 being attached to ring member 22 when the device of this invention is in use.

It is a further advantage of the device of this invention to construct the buoy spindle of plastic or other material impervious to water to prevent deterioration due to the elements and/or marine organisms.

The positioning of the stepped projections can be planned so that a series of closely spaced projections occur at the end positions of buoys which are commonly sized at 6, 8, 10, 11, or 14 inches. The spindle also has a section 30 at the top thereof which is narrower than the rest of the spindle onto which extensions can be added if desired.

Although the present invention has been described with reference to particular embodiments, it will be apparent to those skilled in the art that variations and modifications can be substituted therefor without departing from the principles and spirit of the invention.

I claim:

1. An improved lobster buoy spindle member of the type that is inserted into the central portion of a lobster buoy and extends above and below said buoy, comprising a buoy spindle having means for the retention of a float member thereon and having at the base thereof pivot means to allow rotation of a rope line extending from a trap when affixed thereto, wherein said pivot means is comprised of a pivot plate having a pivot plate aperture centrally defined therein into which the buoy spindle is inserted; a cap member formed at the bottom of the buoy spindle so as to retain the pivot plate thereon adapted so that said pivot plate can rotate on said spindle; and a line member extending and affixed from one side of said pivot plate to the other side of said pivot plate in a fashion so as to form a loop onto which said rope line from said trap can be affixed.

2. An improved lobster buoy spindle member of the type that is inserted into the central portion of a lobster buoy and extends above and below said buoy, comprising a buoy spindle having means for the retention of a float member thereon and having at the base thereof pivot means to allow rotation of a rope line extending from a trap when affixed thereto, wherein said pivot means is comprised of a ring member rotatably affixed to the base of said spindle, further including a retaining means aperture defined within the base of said spindle; a shank portion formed on said ring member; a shank aperture defined longitudinally in said spindle through which said shank is inserted; and means for retaining said shank in said shank aperture placed within said retaining means aperture and affixed to said shank, said shank being adapted to be able to rotate in said shank aperture.

3. The device of claims 1, or 2 wherein said means for retention of said float member comprises a series of stepped projections on said spindle adapted to hold said float member onto said spindle.

4. The device of claim 3 further including a washer member adapted to pass down said spindle and catch on the topmost exposed stepped projection to help retain said float in position on said spindle.

5. The device of claim 1 wherein said spindle base has narrow flattened sides with round edges so as to allow for easy rotation of said pivot plate.

* * * * *